United States Patent
Okada et al.

(10) Patent No.: US 8,526,040 B2
(45) Date of Patent: Sep. 3, 2013

(54) IMAGE FORMING APPARATUS COMPRISING AN INFORMATION PROCESSING APPARATUS, A COMBINATION STORAGE UNIT, A SELECTING UNIT, AND A DISPLAY UNIT

(75) Inventors: Mikiya Okada, Osaka (JP); Terumi Hayashi, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 620 days.

(21) Appl. No.: 12/800,306

(22) Filed: May 12, 2010

(65) Prior Publication Data

US 2010/0290085 A1 Nov. 18, 2010

(30) Foreign Application Priority Data

May 18, 2009 (JP) ................................. 2009-119623

(51) Int. Cl.
*G06F 3/12* (2006.01)
*G06K 15/00* (2006.01)

(52) U.S. Cl.
USPC ........................................ 358/1.15; 358/1.16

(58) Field of Classification Search
USPC .................. 358/1.9, 1.11–1.19, 403; 399/81; 709/224

See application file for complete search history.

(56) References Cited

U.S. PATENT DOCUMENTS

| | | | |
|---|---|---|---|
| 5,987,225 A | 11/1999 | Okano | |
| 7,221,885 B2 | 5/2007 | Sato | |
| 2002/0071689 A1 | 6/2002 | Miyamoto | |
| 2002/0144162 A1 | 10/2002 | Tada et al. | |
| 2006/0136488 A1 | 6/2006 | Mifune et al. | |
| 2006/0164669 A1 | 7/2006 | Itou | |
| 2007/0019229 A1* | 1/2007 | Matsuhara | 358/1.15 |
| 2008/0199199 A1 | 8/2008 | Kato et al. | |
| 2008/0250494 A1 | 10/2008 | Nagata | |
| 2009/0077065 A1* | 3/2009 | Song et al. | 707/5 |
| 2009/0195819 A1* | 8/2009 | Sugimoto et al. | 358/1.15 |
| 2009/0310169 A1 | 12/2009 | Imaizumi et al. | |
| 2010/0005167 A1 | 1/2010 | Kishimoto | |
| 2010/0053692 A1 | 3/2010 | Machiyama | |
| 2010/0265547 A1 | 10/2010 | Katou et al. | |

(Continued)

FOREIGN PATENT DOCUMENTS

| | | |
|---|---|---|
| CN | 1794104 A | 6/2006 |
| CN | 1811609 A | 8/2006 |

(Continued)

OTHER PUBLICATIONS

Notice of Allowance issued in U.S. Appl. No. 12/800,287, mailed May 20, 2013.

*Primary Examiner* — Gabriel Garcia

(74) *Attorney, Agent, or Firm* — Edwards Wildman Palmer LLP; David G. Conlin; Edmund J. Koundakjian

(57) ABSTRACT

A CPU of an MFP executes a program including: a step of receiving information collecting combinations of functions set by a user using an MFP connected to a network from a server computer and storing the information in a function combination management table; a step of reading the function combination management table when a function selected in an MFP is established; a step of displaying three functions of higher priority that are combined with high frequency with the established function, as recommendations; and a step of transmitting, when a job is completed, the combination of selected functions to the server computer, as a job ending process.

8 Claims, 12 Drawing Sheets

(56) References Cited

U.S. PATENT DOCUMENTS

| | | |
|---|---|---|
| 2010/0290068 A1 | 11/2010 | Okada et al. |
| 2010/0290071 A1* | 11/2010 | Okada et al. ................. 358/1.13 |
| 2010/0290085 A1 | 11/2010 | Okada et al. |

FOREIGN PATENT DOCUMENTS

| | | |
|---|---|---|
| JP | 7321984 A | 12/1995 |
| JP | 8-305516 A | 11/1996 |
| JP | 10-079819 A | 3/1998 |
| JP | 2002-006696 A | 1/2002 |
| JP | 2002182529 A | 6/2002 |
| JP | 2002-300332 A | 10/2002 |
| JP | 2004074149 A | 3/2004 |
| JP | 2004-212539 A | 7/2004 |
| JP | 2004-234195 A | 8/2004 |
| JP | 2005-045370 A | 2/2005 |
| JP | 2005-297488 A | 10/2005 |
| JP | 2006229556 A | 8/2006 |
| JP | 2006-285968 A | 10/2006 |
| JP | 2007074149 A | 3/2007 |
| JP | 2007-086865 A | 4/2007 |
| JP | 2007-130981 A | 5/2007 |
| JP | 2008054242 A | 3/2008 |
| JP | 2008-147961 A | 6/2008 |
| JP | 2008-236028 A | 10/2008 |
| JP | 2008-246812 A | 10/2008 |
| JP | 2008-258893 A | 10/2008 |
| JP | 2009077335 A | 4/2009 |

* cited by examiner

FIG. 4

| MACHINE ID | DATE & TIME OF USE | BASIC FUNCTION (MODE) | SET FUNCTION (1) | SET FUNCTION (2) | SET FUNCTION (3) | ... |
|---|---|---|---|---|---|---|
| M001 | 2009/4/6 18:06:15 | COPY | 2in1/4in1 | DUPLEX | – | – |
| M002 | 2009/4/7 09:15:45 | COPY | 2in1/4in1 | TRIAL COPY | – | – |
| | | FAX/IMAGE TRANSMISSION | | | | |
| | | DOCUMENT FILING | | | | |

FIG. 5

| SET FUNCTION | COMBINED FUNCTION | NUMBER OF COMBINATIONS MADE IN PAST 6 MONTHS | DISPLAY PRIORITY |
|---|---|---|---|
| 2in1/4in1 | DUPLEX | 50 | 1 |
| | TRIAL COPY | 45 | 2 |
| | DOCUMENT NUMBER COUNT | 21 | 3 |
| | ... | ... | ... |
| | ... | ... | ... |
| DUPLEX | 2in1/4in1 | 50 | 2 |
| | TRIAL COPY | 21 | 3 |
| | DOCUMENT NUMBER COUNT | 62 | 1 |
| | ... | ... | ... |
| | ... | ... | ... |

FIG. 13

| FUNCTION | WEIGHT (ECO-EVALUATION DEGREE) |
|---|---|
| 2in1 | 1.05 |
| 4in1 | 1.25 |
| DUPLEX COPY | 1.05 |
| TRIAL COPY | 1.55 |
| DOCUMENT NUMBER COUNT | 1.00 |
| ... | ... |

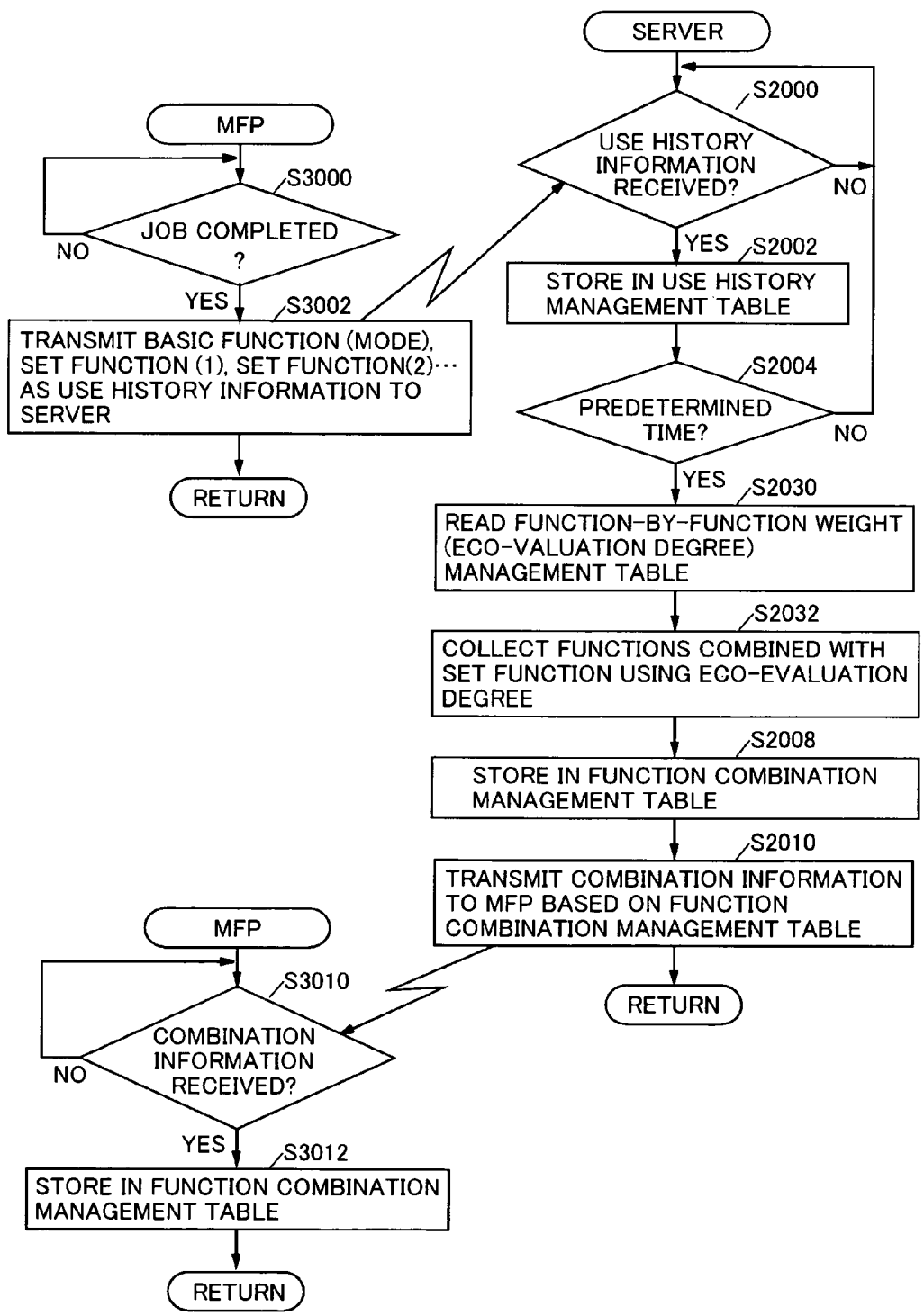

IMAGE FORMING APPARATUS COMPRISING AN INFORMATION PROCESSING APPARATUS, A COMBINATION STORAGE UNIT, A SELECTING UNIT, AND A DISPLAY UNIT

CROSS-REFERENCE TO RELATED APPLICATION

This nonprovisional application claims priority under 35 U.S.C. §119(a) on Patent Application No. 2009-119623 filed in Japan on May 18, 2009, the entire contents of which are hereby incorporated by reference.

BACKGROUND OF THE INVENTION

1. Field of the Invention

The present invention relates to a technique of displaying an appropriate operation guide in accordance with a situation of use in an image forming apparatus having a number of functions, so as to allow a user to easily select a suitable function from among a large number of functions. More specifically, the present invention relates to a technique allowing a user to select even a combination not known to the user, when a plurality of functions are to be combined and used from among a large number of functions.

2. Description of the Background Art

It has become increasingly common to connect an image forming apparatus having a printer function or a copy function to a network, to allow use by a plurality of users. Further, the number of apparatuses having a plurality of functions (modes) such as a copy function, a facsimile function (hereinafter "facsimile" may also be denoted as FAX or fax), a network-supported printer function and a scanner function, such as multi-function peripherals, is increasing. In such a multi-function peripheral, each user selects a basic function (mode) and sets a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such a multi-function peripheral (image forming apparatus), the user inputs image data using, for example, the scanner function, performs image processing (such as collection) by inputting various instructions through an operation panel, and prints the results using the printer function. Some apparatuses allow the user to confirm the result of processing, by providing a thumb-nail image or a preview image to ease user operation. Further, some apparatuses convert such a series of user operations to a macro command and automatically registers with a key, or display operation history as a menu, so as to allow the user to easily instruct the same process. Further, some apparatuses predict and present possible next operation command based on a comparison between operation history and recent operations or based on operation frequency, so as to eliminate the necessity to perform complicated menu selecting operation.

Japanese Patent Laying-Open No. 2008-236028 (Document 1) discloses an image forming apparatus in which an appropriate predicted menu in accordance with the situation of use of the image forming apparatus is displayed, so as to allow the user to easily instruct an image processing function that is often used. The image forming apparatus disclosed in Document 1 includes: a history management unit managing the operation history of the user; a function count management unit counting the state of use of processing functions in the operation history, and outputting a process count value; a prediction control unit predicting image processing operations with priority based on the process count value, and generating a prediction menu; an image working control unit forming an image of reduced size indicating expected result of processing of the object image based on the predicted image processing operation; a preview display control unit displaying the prediction menu including the image of expected result on an operation unit in accordance with the priority; and a process executing unit executing, in response to selection of one item of the prediction menu, the corresponding image processing.

In the image forming apparatus, the operation history of the user is managed; the state of use of process functions in the operation history is counted and the process count value is output; image processing operations are predicted with priority based on the process count value and a plurality of prediction menus are formed accordingly; an image reduced in size is formed representing the expected result of processing based on the predicted image processing operation; the prediction menu including the image of expected result is displayed on the operation unit in accordance with the priority, for every destination of output of the processed result; and in response to selection of one item of the prediction menu, the corresponding image processing is executed. Therefore, an appropriate prediction menu in accordance with the situation of use of the image forming apparatus is displayed, and the image processing function often used by the user can be used without necessitating complicated settings.

Japanese Patent Laying-Open No. 2005-297488 (Document 2) discloses an image forming apparatus allowing, even when a user uses an image forming apparatus that he/she has never operated in the past, the user to utilize operation history stored in another image forming apparatus of a similar type, if the user has an experience of using the image forming apparatus of the similar type that is communicable with the image forming apparatus to be used. The image forming apparatus disclosed in Document 2 includes: an operation history storing unit storing operation history based on operation instructions input through an input unit; a communication unit performing data communication with one or a plurality of other image forming apparatuses communicable through a prescribed network; operation history collecting unit collecting operation histories from the one or plurality of other image forming apparatuses using the communication unit; an operation history integrating unit integrating the operation history stored in the operation history storing unit and the operation history collected by the operation history collecting unit from the one or plurality of other image forming apparatuses; an operation history display unit controlling display on a display unit of the operation histories integrated by the operation history integrating unit; an operation history selecting unit selecting an arbitrary operation history from the operation histories displayed on the display unit; and a setting unit setting the image forming apparatus based on the operation history selected by the operation history selecting unit.

In the image forming apparatus, operation history based on operation instructions is stored in the storage unit; operation histories are collected from one or a plurality of other image forming apparatuses communicable through a prescribed communication medium; the operation history stored in the storage unit and the operation history or histories collected from the one or plurality of other image forming apparatuses are integrated; the integrated operation histories are displayed controlled on the display unit; an arbitrary operation history is selected from the displayed operation histories; and setting is done based on the selected operation history. Therefore, even when the user uses an image forming apparatus he/she has never operated before (no operation history is stored), it is possible to use operation history stored in another image forming apparatus of a similar type, if the user has operated the image forming apparatus of the similar type communicable to the image forming apparatus to be used (that is, operation history is stored in the image forming apparatus of the similar type). Therefore, even if the image forming apparatus is to be used for the first time, it is possible to reduce the trouble of setting each and every item from scratch. Thus, the conventional problem that all settings must be done from scratch when a new image forming apparatus is to be used as operation history of other image forming apparatus is unavailable, can be solved. The user can easily select and re-use desired operation history, and the operation history stored in each image forming apparatus can effectively be utilized, whereby operation efficiency and productivity can be improved.

SUMMARY OF THE INVENTION

Recent multi-function peripherals have a large number of different functions, to meet various and many demands of the users. When a user using such a multi-function peripheral repeatedly selects the same function, it is possible by the technique disclosed in Document 1 to reduce complicated operations, since the function to be selected next by the user is predicted with high accuracy and the prediction menu is displayed. According to the technique disclosed in Document 2, even when an image forming apparatus not operated in the past is to be used, it is possible to utilize operation history stored in an image forming apparatus of a similar type and to select the same function, if the image forming apparatus of the similar type has been operated in the past, so that operability can be improved.

If a multi-function peripheral has a huge number of functions, however, it is expected that each user uses combinations of only a very limited functions. For instance, though a skilled user may use a combination of appropriate functions to save energy, a beginner may not know and hence not use such a combination of functions. Particularly, when a multi-function peripheral is connected through a network and shared by various users, it is very likely that only a small number of users know combinations of functions that are suitable for energy saving or attain job-related high efficiency while most of other users are not aware of such combinations.

The present invention was made to solve the above-described problem, and its object is to provide an information processing apparatus processing information related to a function that can be combined to another function, an image forming apparatus having the information processing apparatus, or an image forming apparatus having a communication apparatus communicable with the information processing apparatus, allowing, in an image forming apparatus having various and may functions in which the functions are appropriately combined and used, even a beginner to appropriately combine and use a number of functions, by appropriately presenting combinations of functions not known to the beginner but known by other user or users.

According to the present invention, an information processing apparatus processes information related to a combination of functions selected by a user from a plurality of functions of an image forming apparatus. The information processing apparatus includes: an obtaining unit obtaining use history information related to the function selected by the user; a use history storage unit storing the use history information; a collecting unit collecting combination information related to frequency of combination between one function and another function, based on the stored use history information; and an applying unit applying the collected combination information to the image forming apparatus.

In the image processing apparatus, use history information related to a function selected by a user in an image forming apparatus is obtained and, based on the pieces of use history information of many users, combination information related to the frequency of combination of one function and another function is collected. The collected combination information is given to the image forming apparatus. Based on the combination information collected by the information processing apparatus, it becomes possible for the image forming apparatus to display a function often combined with the function selected by the user. As a result, in an image forming apparatus having various and may functions in which the functions are appropriately combined and used, it becomes possible to appropriately present a combination or combinations of functions not known to the user himself/herself but known to other user or users. Thus, even a beginner can appropriately combine and use many functions.

The information processing apparatus may further include a function storage unit storing, function by function, degree of benefit received by the user when the function is selected. Here, the collecting unit may collect the combination information using the degree of benefit.

The combination information collected using the degree of benefit received by the user of image forming apparatus may be utilized for display on the image forming apparatus such that, for example, a combination of functions that attain greater effect of energy saving is recommended (selection of such a combination is urged). This leads to greater benefit for the user.

The collecting unit may be configured to collect the combination information such that the higher becomes the degree of benefit, the higher becomes the frequency.

It is possible to display a combination attaining greater degree of benefit (for example, a combination of functions attaining greater effect of energy saving) with higher priority, on the image forming apparatus. In this manner, benefit for the user can efficiently be increased.

The benefit may be benefit of energy saving.

It becomes possible to appropriately combine functions in the image forming apparatus and, therefore, waste of power, toner and sheets of recording paper can be reduced.

According to a further aspect, the present invention provides an image forming apparatus including any of the above-described information processing apparatuses. According to a still further aspect, the present invention provides an image forming apparatus including a communication apparatus communicable with any of the above-described information processing apparatuses.

It becomes possible, using the combination information obtained from the information processing apparatus, for the user to easily select a combination of appropriate functions in the image forming apparatus.

The image forming apparatus may further include: a combination storage unit for storing the combination information; a selecting unit allowing a user to select one function from a plurality of functions; and a display unit displaying a function combined with high frequency with the selected one function based on the combination information.

In the image forming apparatus, when one function is selected by the user, a function highly frequently combined with the selected one function is displayed. The function that is highly frequently combined involves many users (many people other than the user himself/herself) and, therefore it becomes possible to easily know useful combination of a function not known to the user but known to others, in relation to the function selected by the user himself/herself.

The display unit may display functions that are combined with high frequency in order, starting from a function of the highest frequency.

It is possible to know a function, not known to the user himself/herself but used in combination by many users, easily in relation to the function selected by the user himself/herself.

The display unit displays the function or functions that are combined with high frequency, excluding a function not available in the apparatus.

Image forming apparatuses do not always have the same functions. Since a combination of functions not selectable in the image forming apparatus of interest is excluded from the display, confusion by the user can be avoided.

According to the information processing apparatus and the image forming apparatus including the information processing apparatus or the image forming apparatus including a communication apparatus communicable with the information processing apparatus, in an image forming apparatus having various and may functions in which the functions are appropriately combined and used, it becomes possible to appropriately present a combination or combinations of functions not known to the user himself/herself but known to other user or users. As a result, even a beginner can use the image forming apparatus while appropriately combining many functions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a use history management table stored in the server computer of FIG. 1.

FIG. 5 shows a function combination management table stored in the server computer of FIG. 1.

FIG. 13 shows a function-by-function weight (eco-evaluation degree) management table stored in a server computer in accordance with a third embodiment of the present invention.

FIG. 14 is a flowchart representing a control structure of a use history processing program executed by the server computer and MFP in accordance with the third embodiment of the present invention.

DESCRIPTION OF THE PREFERRED EMBODIMENTS

Figure 1:
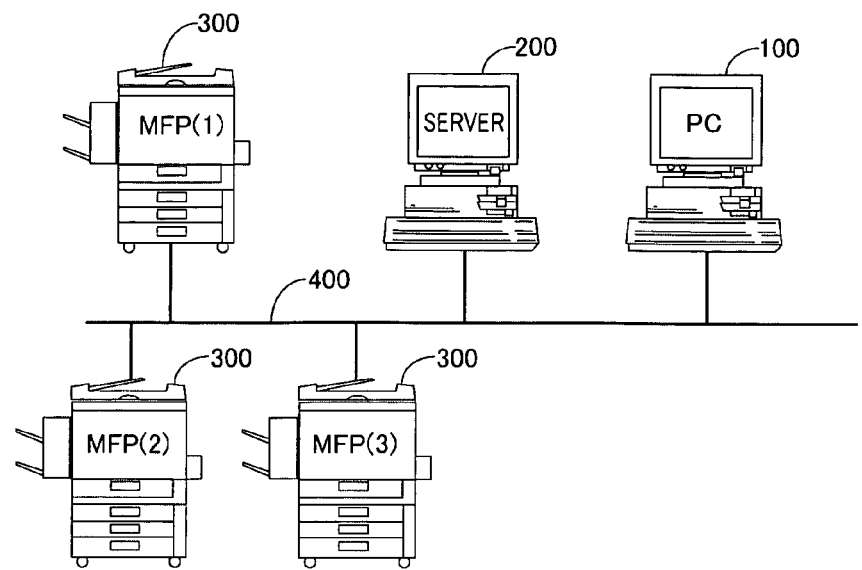
FIG. 1 shows an overall configuration of a network image forming system including an information processing apparatus (server computer) and an image forming apparatus (MFP) in accordance with a first embodiment of the present invention.

In the following description, the same components are denoted by the same reference characters. Their functions and names are also the same. Therefore, detailed description thereof will not be repeated. In the following description, it is assumed that the image forming apparatus for forming an image on a sheet of recording paper is an MFP (Multifunction Peripheral). The present invention, however, is applicable to any apparatus having at least the printing function and in which various and many functions are combined and used, and application is not limited to an MFP.

Further, in the following description, it is assumed that the information processing apparatus processing information related to the function to be combined with selected one function is a server computer. The information processing apparatus, however, may be included in the MFP. Further, though a network image forming system including a plurality of MFPs is described, the network image forming system may be formed simply by one MFP including the information processing apparatus mentioned above.

-First Embodiment-

[Overall System Configuration]

Referring to FIG. 1, an overall configuration of the network image forming system in accordance with the first embodiment of the present invention will be described. The network image forming system includes: a personal computer (PC) 100; MFP(1) 300 to MFP(3) 300 (hereinafter MFP(1) 300 to MFP (3) 300 may be generally referred to as MFP 300) receiving a copy request or a print request and printing an image on a sheet of recording paper; and a server computer 200 processing use history of users of the plurality of MFPs 300. Client computer 100, server computer 200 and MFP 300 are connected to be communicable to each other by a network line 400 in accordance with, for example, IEEE802.3. Though MFP(1) 300 to MFP(3) 300 are denoted by the same reference characters, they are not necessarily MFPs having the same functions.

Server computer 200 stores use history of a user in MFP 300 received through network line 400, in a use history management table. Further, based on the use histories of many users, server computer 200 collects function combination information of functions used in combination in MFP 300, and stores the results in function combination management table. Server computer 200 transmits the combination information to MFP 300 through network line 400. Based on the combination information received from server computer 200, MFP 300 displays a function often combined with the function selected by the user on the touch-panel display.

In the following, in the specification and drawings, server computer 200 may be simply referred to as a server, and MFP 300 may be simply referred to as an MFP.

[Hardware Configuration]

<Server Computer 200>

Figure 2:
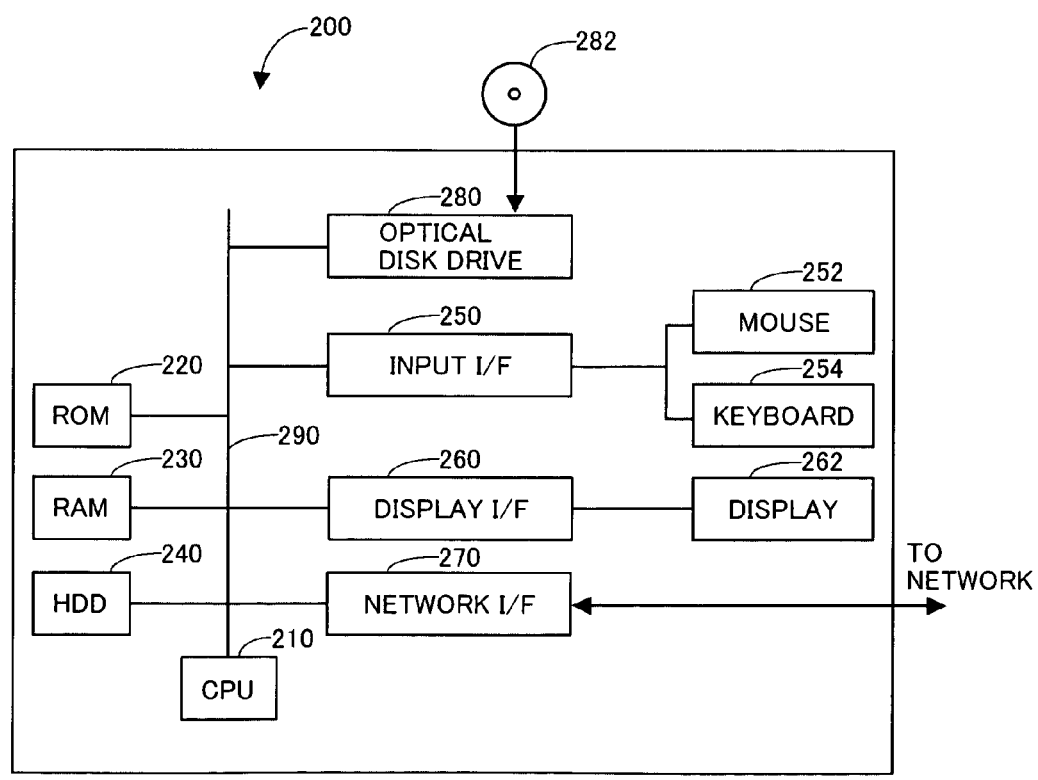
FIG. 2 is a control block diagram showing hardware configuration of the server computer shown in FIG. 1.

Referring to FIG. 2, server computer 200 forming the network image forming system in accordance with the present embodiment includes: a bus 290; a CPU (Central Processing Unit) 210 connected to bus 290; an ROM (Read Only Memory) 220 connected to bus 290; an RAM (Random Access Memory) 230 connected to bus 290; a hard disk (HDD) 240 connected to bus 290; an optical disk drive 280, connected to bus 290, on which an optical disk 282 is mountable, and capable of writing of information to optical disk 282 and reading of information from optical disk 282; an input interface (hereinafter referred to as "input I/F") 250, connected to bus 290, for providing an interface for connection between a mouse 252 and a keyboard 254; a display interface (hereinafter referred to as a "display I/F") 260, connected to bus 290, for providing an interface related to connection with a display 262; and a network interface (hereinafter referred to as a "network I/F") 270 providing wired or wireless (in the present embodiment, wired) connection to network line 400. Server computer 200 may include a magnetic disk drive on which a magnetic disk is mountable, and capable of writing of information to the magnetic disk and reading of information from the magnetic disk, in place of/in addition to optical disk drive 280.

Bus 290, ROM 220, RAM 230, hard disk 240, optical disk drive 280, input I/F 250, display I/F 260 and network I/F 270 all operate in cooperation with each other under the control of CPU 210, and as the server computer in accordance with the present invention, server computer 200 realizes processes of various applications. Such applications realize a server computer of a network image forming system for appropriately presenting a combination of functions often used, for example, in MFP 300.

The computer program or programs causing server computer 200 to operate as the server computer of the network image forming system in accordance with the present embodiment are stored in optical disk 282 to be inserted to optical disk drive 280, and transferred to hard disk 240. Alternatively, the programs may be transmitted through network line 400 to server computer 200 and stored in hard disk 240. At the time of execution, the programs are loaded to RAM 230. The programs may be directly loaded to RAM 230 from optical disk 282 or through network line 400.

These programs include a plurality of instructions causing server computer 200 to operate as the server computer in the network image forming system in accordance with the present embodiment. Some of the basic functions necessary to realize these operations are provided by an operating system (OS) operating on server computer 200 or a third-party program, or a module of various tool kits installed in server computer 200. Therefore, the program may not necessarily include all functions required to realize the method and system in accordance with the present embodiment. The program may include only the instructions executing a prescribed process as server computer 200 described above, by calling appropriate functions or "tools" in a controlled manner to attain the desired results. General operations of a computer as the substance of server computer 200 are well known and, therefore, description will not be given here.

Personal computer 100 also has a configuration similar to that of server computer 200 described above. In personal computer 100, a printer driver, for example, is installed. Document data formed by an application such as a word processor is transmitted through the printer driver to MFP 300.

<MFP 300>

Figure 3:
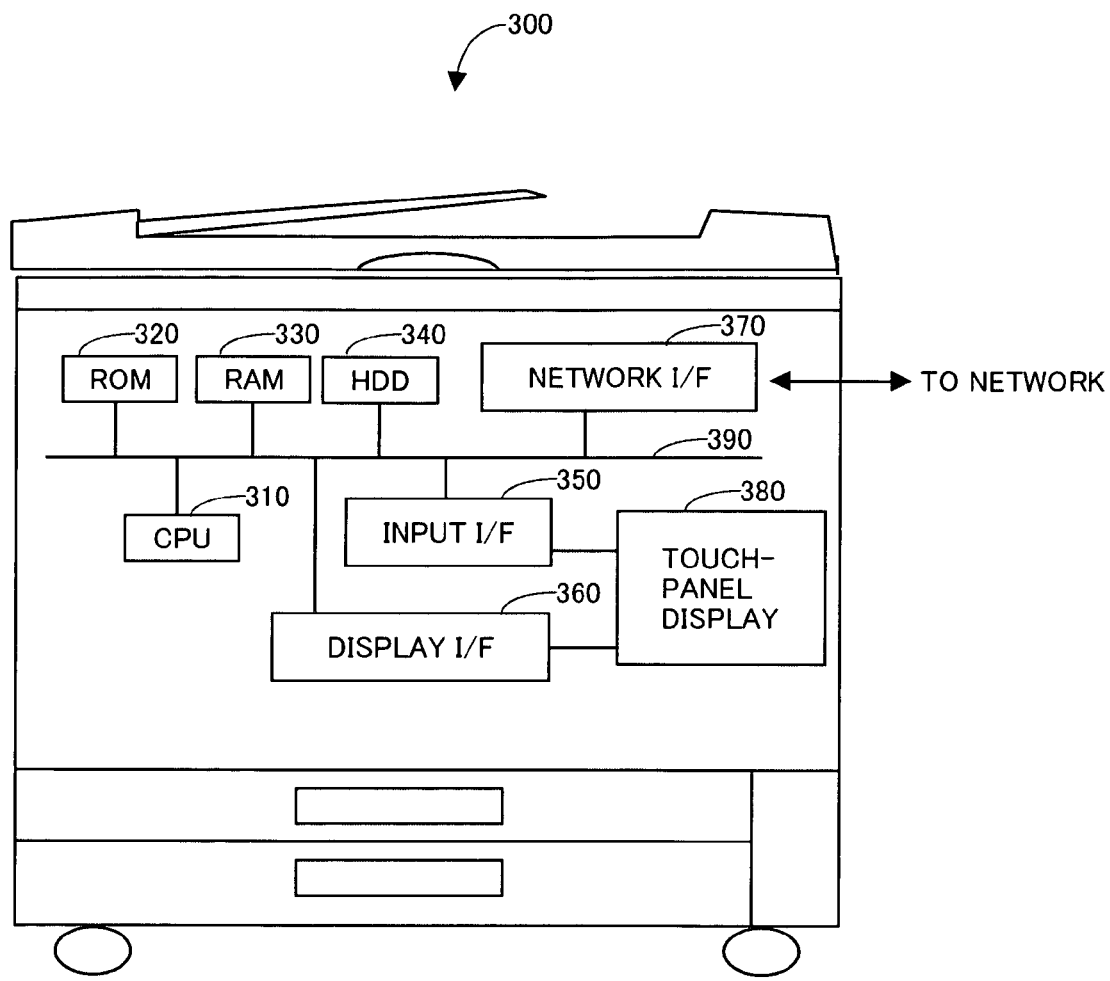
FIG. 3 is a control block diagram showing hardware configuration of the MFP shown in FIG. 1.

Referring to FIG. 3, MFP 300 forming the network image forming system in accordance with the present embodiment includes: a bus 390; a CPU 310 connected to bus 390; an ROM 320 connected to bus 390; an RAM 330 connected to bus 390; an HDD 340 connected to bus 390; an input I/F 350 and a display I/F 360, connected to bus 390, for providing interface related to connection with touch-panel display 380; and a network I/F 370 providing wired or wireless (in the present embodiment, wired) connection to network line 400. Though not shown in FIG. 3, MFP 300 includes hardware buttons such as a start button and ten-key buttons.

Bus 390, ROM 320, RAM 330, hard disk 340, input I/F 350, display I/F 360 and network I/F 370 all operate in cooperation with each other under the control of CPU 310, and realize the printing process, FAX transmission/reception process, scanner process and copy process in MFP 300. These processes are executed by various components forming MFP 300, not shown in FIG. 3, under the control of CPU 310.

MFP 300 includes, for example, a document reading unit, an image forming unit, a paper feed unit, and a paper discharge unit. In MFP 300, on image data of an original document read by the document reading unit, various image processing operations are done by CPU 310, and the resulting image data is output to the image forming unit. MFP 300 includes a so-called laser type (electrophotographic type) printing function, in which a laser beam is used for exposure. It may have a different type printing function.

The image forming unit is for printing an image represented by the image data on a sheet of recording paper, and it includes, by way of example, a photoreceptor drum, a charger, a laser scanning unit, a developer, a transfer device, a cleaning device, a fixing device and a neutralizer. In the image forming unit, a feeding path, for example, is formed, and a sheet of recording paper fed from the paper feed unit is fed along the feeding path. The paper feed unit draws out sheets of recording paper stacked on a paper feed cassette or on a manual feed tray one by one, and feeds the sheet of paper to the feeding path of the image forming unit.

While the sheet of recording paper is fed along the feeding path of image forming unit, the sheet passes between the photoreceptor drum and the transfer device, and further passes through the fixing device, whereby printing is done on the sheet of recording paper.

The photoreceptor drum rotates in one direction, and its surface is cleaned by the cleaning device and the neutralizer and, thereafter, uniformly charged by the charger. The laser scanning unit modulates the laser beam based on the image data to be printed, and repeatedly scans the surface of photoreceptor drum with the laser beam in a main scanning direction, whereby an electrostatic latent image is formed on the surface of photoreceptor drum. The developer develops the electrostatic latent image by supplying toner to the surface of photoreceptor drum, and thus, a toner image is formed on the surface of photoreceptor drum.

The transfer device transfers the toner image on the surface of photoreceptor drum to the sheet of recording paper passing between the transfer device and the photoreceptor drum. The fixing device includes a heating roller for heating the sheet of recording paper and the pressure roller for pressing the sheet of recording paper. As the sheet of recording paper is heated by the heating roller and pressed by the pressure roller, the toner image that has been transferred to the sheet of recording paper is fixed on the sheet. The sheet of recording paper discharged from the fixing device (printed paper) is discharged to the discharge tray. The paper discharging device may perform a process of sorting a plurality of printed sheets of paper to be output to different discharge trays, a process of punching each sheet of recording paper or a process of stapling the sheets of recording paper. Assume that a number of copies of the printing are to be prepared. In that case, sheets of recording paper are sorted and discharged to paper discharge trays such that each tray contains each set of printed sheets, and the set of printed sheets in each tray is stapled or punched, whereby copies of prints are prepared. Such processes are performed under the control of CPU 310. Punching process may be done on each sheet of the printing paper.

[Management Table Configuration]

Referring to FIG. 4, the use history management table stored in HDD 240 of server computer 200 will be described. The use history management table stores use history representing which function or a combination of which functions is utilized by the user in MFP 300, based on the use history information transmitted from MFP 300. If functions are not combined, only the selected one function is stored as the use history.

As shown in FIG. 4, the use history table consists of: a field for storing user ID for uniquely identifying a user; a field for storing machine ID for uniquely identifying MFP 300; a field for storing information related to date and time of use; a field for storing basic function used (copy mode, fax/image transmission mode, document filing mode and the like); and fields for storing set function (1), set function (2), set function (3) . . . used in combination. The set functions may be stored assuming that the user set the functions time-sequentially in the order of set function (1), set function (2), set function (3) . . . , or the function or functions may be stored in accordance with a predetermined priority.

Referring to FIG. 5, a function combination management table stored in HDD 240 of server computer 200 will be described. The function combination management table stores, based on the use history information stored in the use history table shown in FIG. 4, the number of combinations of functions combined to a set function, and display priority that corresponds to the number of combinations in descending order.

As shown in FIG. 5, the function combination management table consists of a field for storing the set function (corresponding to set function (1) of FIG. 4); a field for storing a function (corresponding to set function (2) or set function (3) of FIG. 4) combined with the set function; a field for storing the number of combinations representing how many times the function has been combined in the past six months; and a field for storing the display priority based on the number of combinations.

In FIG. 5, a combination of set function (1) (for example, 2-in-¼-in-1) and set function (2) (for example, duplex) is also a combination of set function (1) (for example, duplex) and set function (2) (for example, 2-in-¼-in-1). Therefore, if these functions are combined, the number of combinations is counted twice. If three functions are combined, three combinations, that is, the combination of set functions (1) and (2), the combination of set functions (1) and (3), and the combination of set functions (2) and (3) are counted.

Though the period for collecting the number of combinations is set to past six months in the example of FIG. 5, the present invention is not limited to the above. The period may be shorter or longer, or the period may be set by a user (in this case, the user may include an administrator).

[Software Configuration]

Figure 6:
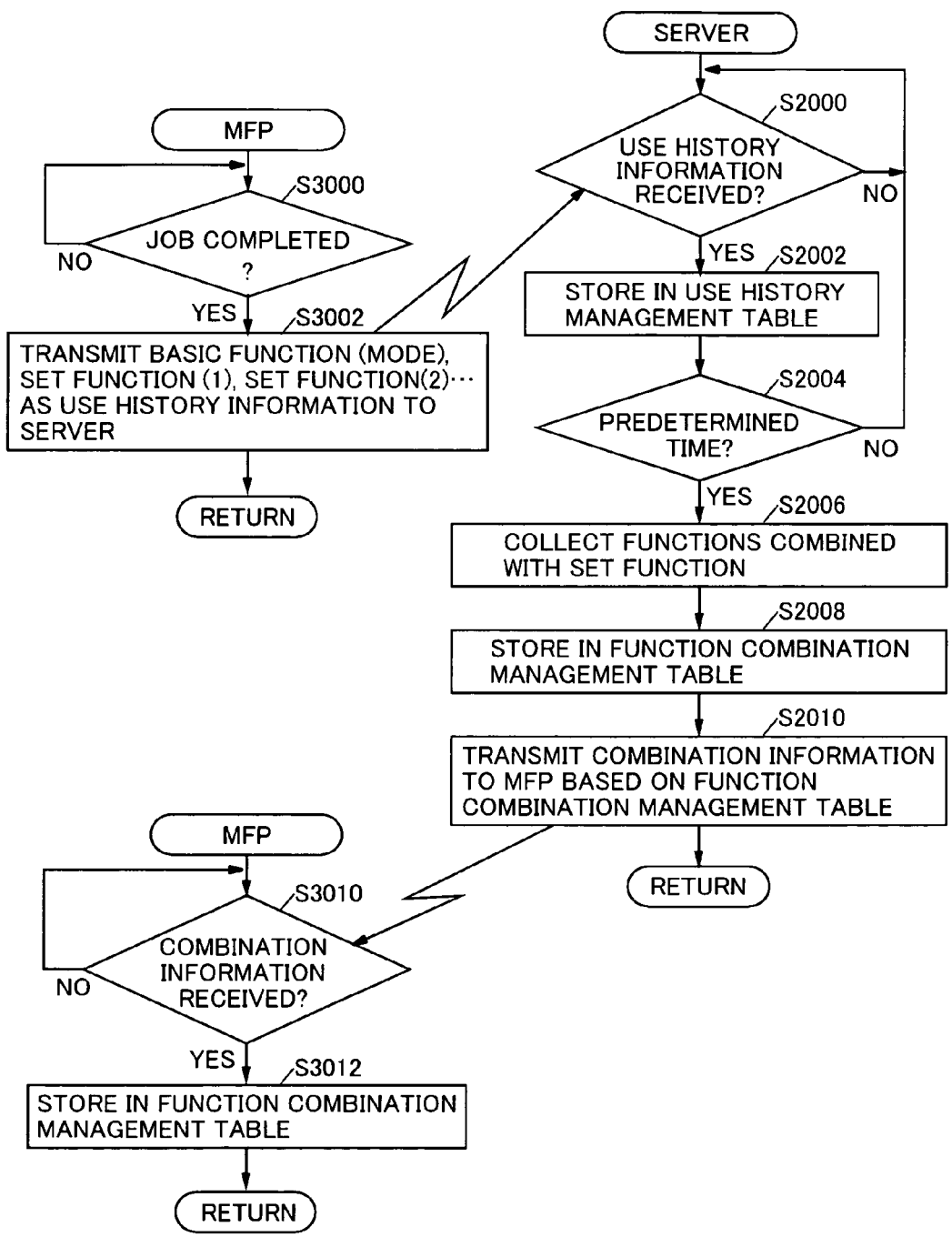
FIG. 6 is a flowchart representing a control structure of a use history processing program executed in the server computer and the MFP of FIG. 1, respectively.

Referring to FIG. 6, a control structure of a computer program executed by server computer 200 and MFP 300 to realize the user use history processing in the network image forming system in accordance with the present embodiment will be described.

The program shown on the upper left side of FIG. 6 is executed by CPU 310 of MFP 300. At step (hereinafter, "step" will be denoted by "S") 3000, CPU 310 of MFP 300 (hereinafter simply referred to as CPU 310) determines whether or not a job in MFP 300 is completed. Here, if the requested process ends successfully, CPU 310 determines that the job in MFP 300 is completed. If it is determined that the job in MFP 300 is completed (YES at S3000), the process proceeds to S3002. Otherwise (NO at S3000), the process returns to S3000, and waits until it is determined that the job in MFP 300 is completed.

At S3002, CPU 310 transmits the basic function (mode), set function (1), set function (2) . . . , of the job that is determined to be completed, as use history information, to server computer 200.

The program shown on the right side of FIG. 6 is executed by CPU 210 of server computer 200. At S2000, CPU 210 of server computer 200 (hereinafter simply referred to as CPU 210) determines whether or not the use history information is received from MFP 300. At this time, determination is made for a plurality of MFPs 300. If it is determined that the use history information is received from MFP 300 (YES at S2000), the process proceeds to S2002. Otherwise (NO at S2000), the process returns to S2000, and waits until it is determined that the use history information is received from MFP 300.

At S2002, CPU 210 stores the use history information received from MFP 300 in use history management table shown in FIG. 4. Pieces of use history information are received from a plurality of MFPs 300 and stored in the use history management table, whereby many pieces of use history information come to be stored, in use history management table. In FIG. 4, pieces of information of which date and time of use is older than six months are erased, or not reflected on the collection of combined functions.

At S2004, CPU 210 determines whether a predetermined time is reached. The predetermined time corresponds to a time interval for collecting the combined functions. If it is determined that the predetermined time (for example, time corresponding to the time interval of 12 hours) is reached (YES at S2004), the process proceeds to S2006. Otherwise (NO at S2004), the process returns to S2000. The process flows in this manner since collecting the combined functions may be done with appropriate time interval, while updating of use history management table is done on real time basis upon reception of the use history information from a plurality of MFPs 300.

At S2006, CPU 210 collects functions combined with the set function based on the use history information stored in the use history management table. At S2008, CPU 210 stores the collected results in the function combination management table shown in FIG. 5. Thus, the function combination management table is updated at a constant time interval.

At S2010, CPU 210 transmits the combination information (set function, combined function and display priority) to MFP 300, based on the function combination management table. In order to reduce communication traffic, transmission of combination information to MFP 300 may be transmission of only the portions that changed after the last transmission, as difference data. Further, the time interval for updating the function combination management table and the time interval for transmitting to MFP 300 may be different from each other.

The program shown on the lower left side of FIG. 6 is executed by CPU 310 of MFP 300. At S3010, CPU 310 determines whether or not the combination information is received from server computer 200. If it is determined that the combination information is received from server computer 200 (YES at S3010), the process proceeds to S3012. Otherwise (NO at S3010), the process returns to S3010, and waits until it is determined that the combination information is received from server computer 200.

At S3012, CPU 310 stores the combination information received from server computer 200 in the function combination management table. At this time, CPU 310 stores a management table in which the combination number field for the past six months removed from the function combination management table shown in FIG. 5 as the function combination management table, in HDD 340. Thus, it is possible in each of the plurality of MFPs 300 to store the functions often combined in MFP 300 connected to the network line 400.

Figure 7:
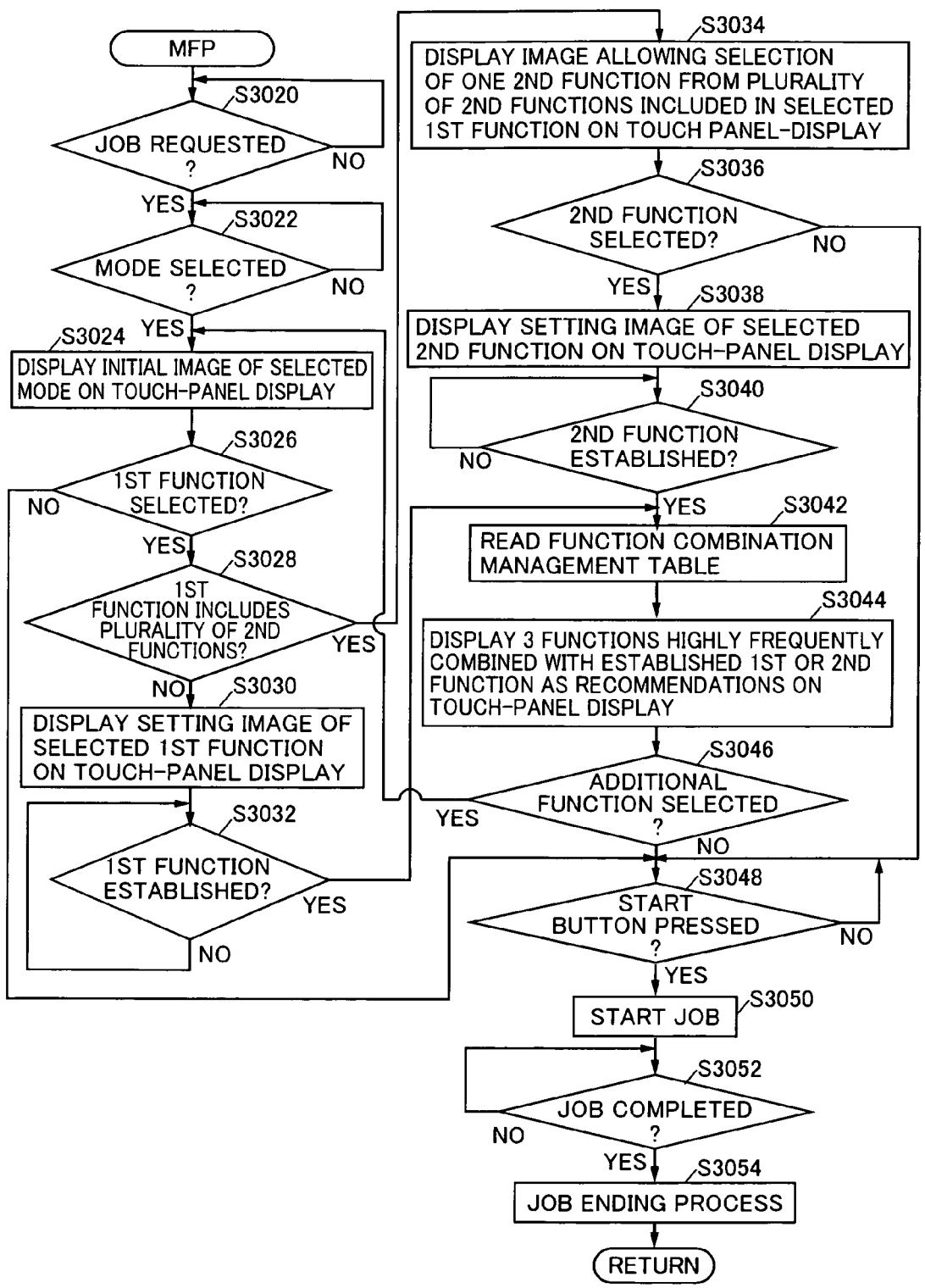
FIG. 7 is a flowchart representing a control structure of a function setting program executed by the MFP of FIG. 1.

Referring to FIG. 7, a control structure of a computer program executed by MFP 300 for allowing a user to set a function in the network image forming system in accordance with the present embodiment will be described.

At S3020, CPU 310 determines whether or not a user requested a job. At this time, if an arbitrary hardware button is pressed and sleep mode (energy saving mode) of MFP 300 is canceled or if an arbitrary software button on touch-panel display 380 is pressed, CPU 310 determines that a user has requested a job. If it is determined that the user requested a job (YES at S3020), the process proceeds to S3022. Otherwise (NO at S3020), the process returns to S3020, and waits until it is determined that a user requested a job.

At S3022, CPU 310 determines whether or not mode selection is done. This MFP 300 has three modes, that is, "copy mode", "fax/image transmission mode" and "document filing mode." By way of example, when any of software buttons corresponding to the three modes displayed at the top of touch-panel display 380 is pressed, CPU 310 determines that the user has made mode selection. If it is determined that the user has made mode selection (YES at S3022), the process proceeds to S3024. Otherwise (NO at S3022), the process returns to S3022, and waits until it is determined that the user has made mode selection.

At S3024, CPU 310 displays an initial image of the selected mode on touch-panel display 380. On the initial image of the copy mode, "color mode", "copy density", "magnification", "document direction" and "paper size & direction" are displayed, together with software buttons for changing such settings. Among software buttons for selecting functions, there is a button for selecting functions such as "duplex copy" and "finishing" (hereinafter referred to as "first function") and a button for selecting a "special function" (also referred to as the "first function"). If the "special function" is selected, it is possible to additionally select a function or functions such as "2-in-¼-in-1", "margin" and "frame erasure" (hereinafter referred to as "second function"). Specifically, the first function refers to functions displayed on the initial image of each mode, including functions that can be selected by simply selecting the first function, and a function of selecting the second function. No matter whether "2-in-¼-in-1" as the "special function" is selected first and then "duplex copy" is selected or "duplex copy" is selected first and then "2-in-¼-in-1" as the "special function" is selected, it is considered that the function of "duplex copy" and the function of "2-in-¼-in-1" are combined. It is noted that the present invention is not limited to such a menu hierarchy.

At S3026, CPU 310 determines whether or not the user has selected the first function. If it is determined that the user has selected the first function (YES at S3026), the process proceeds to S3028. Otherwise (NO at S3026), the process proceeds to S3048.

At S3028, CPU 310 determines whether or not the first function selected by the user includes a plurality of second functions. If the first function includes a plurality of second functions (YES at S3028), the process proceeds to S3034. Otherwise (NO at S3028), the process proceeds to S3030.

At S3030, CPU 310 displays a setting image for the first function selected by the user, on touch-panel display 380. At S3032, CPU 310 determines whether or not the first function has been established. Here, by way of example, if a prescribed item is set on the setting image of the first function (for example, "duplex copy") displayed on the touch-panel display and thereafter an "OK" button is pressed, CPU 310 determines that the first function is established. If it is determined that the first function is established (YES at S3032), the process proceeds to S3042. Otherwise (NO at S3032), the process returns to S3032 to wait until the first function is established.

At S3034, CPU 310 displays an image allowing selection of one second function among a plurality of second functions included in the selected first function, on touch-panel display 380. At S3036, CPU 310 determines whether the user has selected the second function. If it is determined that the user has selected the second function (YES at S3036), the process proceeds to S3038. Otherwise (NO at S3036), the process proceeds to S3048.

At S3038, CPU 310 displays a setting image for the second function selected by the user on touch-panel display 380. At S3040, CPU 310 determines whether or not the second function is established. Here, by way of example, if a prescribed item is set on the setting image of the second function (for example, "2-in-¼-in-1") displayed on the touch-panel display and thereafter an "OK" button is pressed, CPU 310 determines that the second function is established. If it is determined that the second function is established (YES at S3040), the process proceeds to S3042. Otherwise (NO at S3040), the process returns to S3040 to wait until the second function is established.

At S3042, CPU 310 reads the function combination table (the management table of FIG. 5 with the combination number field of the past six months removed) from HDD 340. At S3044, CPU 310 displays as recommendations, three functions of higher priority that are combined with high frequency with the established first function or the established second function, on touch-panel display 380. The number of recommended functions displayed at this time is not limited to three, and larger number of recommended functions may be displayed. It is also possible that a management table including the field of combination number of past six months is used as the function combination management table stored in HDD 340 of MFP 300, and (any number of) functions of which number of combinations in the past six months exceeds a threshold value (for example, 20 times) may be displayed.

At S3046, CPU 310 determines whether or not the user further selects an additional function. At this time, since the first function or the second function has been established (YES at S3032 or YES at S3040), it means that an additional function is further combined therewith. Here, by way of example, if a software button on touch-panel display 380 corresponding to a function displayed as a recommendation is pressed, CPU 310 determines that an additional function is selected. If it is determined that an additional function is selected (YES at S3046), the process returns to S3024. Otherwise (NO at S3046), the process proceeds to S3048. If it is determined that an additional function is selected (YES at S3046), the process may proceed to S3024, S3030 or S3038, in accordance with the selected function.

At S3048, CPU 310 determines whether or not the start button is pressed. If it is determined that the start button is pressed (YES at S3048), the process proceeds to S3050. Otherwise (NO at S3048), the process returns to S3048. If it is not determined that the start button is pressed (NO at S3048), the process may proceed to S3024.

At S3050, CPU 310 starts a job in accordance with the set function or functions. At this time, by way of example, image data of an original document read by the document reading unit is output to the image forming unit, and at the image forming unit the image represented by the image is printed on a sheet of recording paper, in MFP 300.

At S3052, CPU 310 determines whether the job is completed. If it is determined that the job in MFP 300 is completed (YES at S3052), the process proceeds to S3054. Otherwise (NO at S3052), the process returns to S3052 and waits until it is determined that the job in MFP 300 is completed.

At S3054, CPU 310 performs an ending process for the job that is determined to be completed. An example of the ending process includes transmission of basic function (mode), set function (1), set function (2) . . . as the use history information to server computer 200, of S3002 shown in FIG. 6. The ending process may be a different process, such as an accounting process.

[Operation]

The operation of network image forming system in accordance with the present embodiment based on the structures and flowcharts as above will be described in the following.

<Use History Processing Operation>

Using the use history management table shown in FIG. 4, the function combination management table shown in FIG. 5 and the flowchart of FIG. 6, the use history processing operation of the network image forming system will be described.

First, when the user selects a desired function (for example, copy function) and performs a job (for example, a collective duplex copying) and the job is completed (YES at S3000) in MFP 300, the basic function (mode) and set function (1), set function (2), . . . selected by the user for the job in MFP 300 are transmitted as the use history information to server computer 200 (S3002).

In response to such an operation of MFP 300, server computer 200 receives the use history information from MFP 300 (YES at S2000). The received use history information is stored in HDD 240, in the form of the use history management table shown in FIG. 4 (S2002).

When a predetermined time for collecting the functions combined is reached (YES at S2004), based on the use history information stored in the use history management table, the functions combined with the set function are collected (S2006). The collected results are stored in the function combination management table shown in FIG. 5 (S2008). Based on the function combination management table, the combination information (set function, combined function and display priority) is transmitted to MFP 300 (S2010).

In response to such an operation of server computer 200, each of the plurality of MFPs 300 receives the combination information from server computer 200 (YES at S3010). The received combination information is stored in the form of the function combination management table (the function combination management table of FIG. 5 with the field of combination number of the past six months removed) in HDD 340 (S3012).

In server computer 200, pieces of use history information from the plurality of MFPs 300 are received and the use history management table (FIG. 4) is updated on real time basis and the use history of each user is accumulated in the use history management table. While the use history of each user is accumulated in the use history management table, the combined functions are collected at a predetermined time interval. Here, based on the use history information stored in the use history management table, the functions combined with the set function are collected, and the function combination management table is updated at a constant time interval. The combination information reflecting the updated function combination management table is transmitted to the plurality of MFPs 300.

<Function Setting Operation>

Using the flowchart of FIG. 7 and the image transitions on touch-panel display 380 shown in FIGS. 8 to 11, the function setting operation of the network image forming system will be described.

Figure 8:
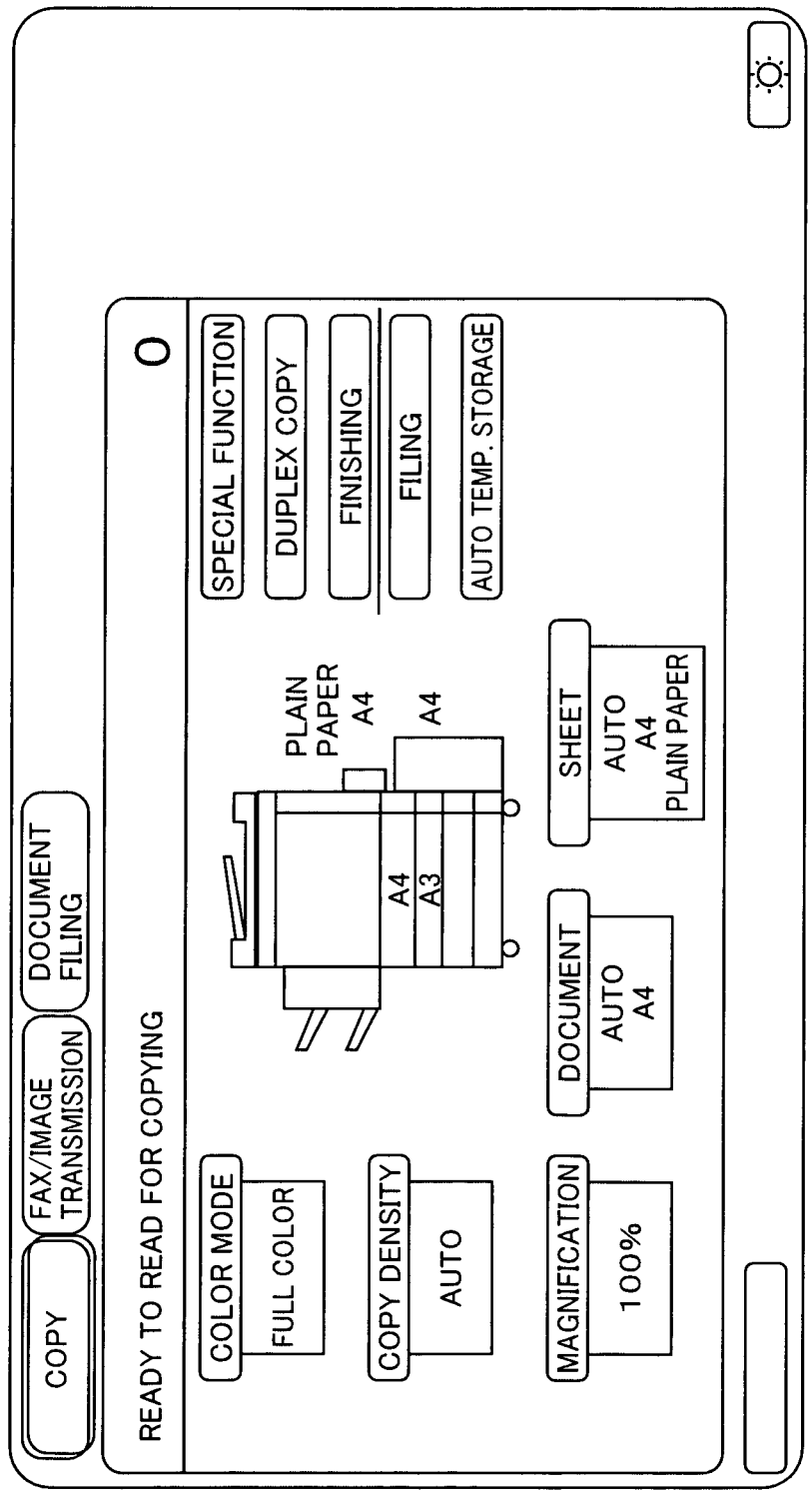
FIGS. 8 to 11 are transition diagrams showing exemplary displays on a touch-panel display when the program of FIG. 7 is executed.

When a job is requested (YES at S3020) and a desired mode is selected (YES at S3022) in MFP 300, the initial image for the selected mode is displayed on touch-panel display 380 (S3024). FIG. 8 shows an exemplary initial image of the copy mode displayed on touch-panel display 380, when the "copy" mode button on the top left part of touch-panel display 380 is pressed.

Figure 9:
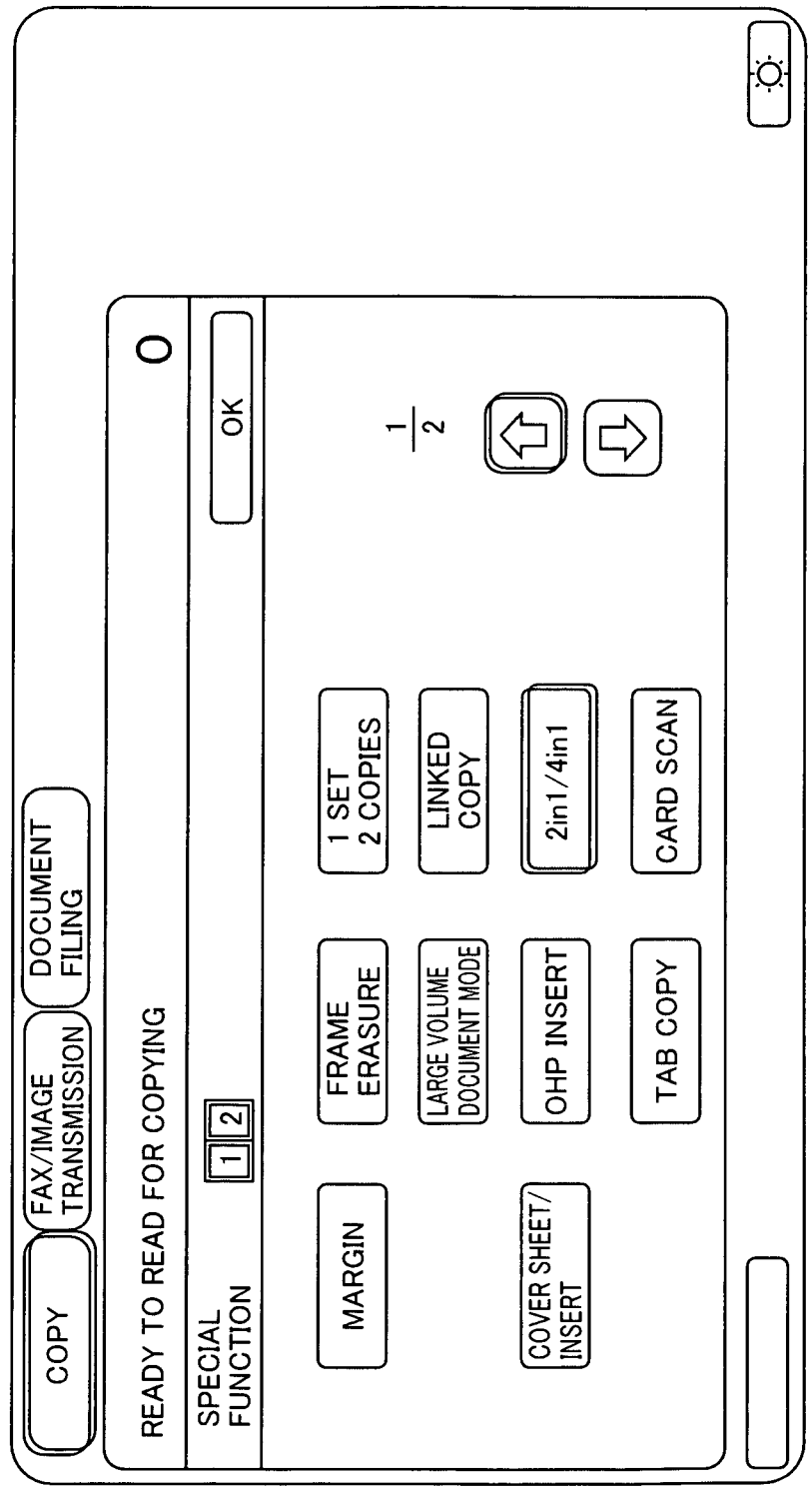

In FIG. 8, if the user presses the "special function" button (YES at S3026), since the special function includes a plurality of functions (YES at S3028), an image allowing selection of one second function among the plurality of second functions included in the selected special function (first function) is displayed on touch-panel display 380 (S3034). FIG. 9 shows an exemplary image of the special function menu, displayed on touch-panel display 380 after the "special function" button is pressed in FIG. 8.

Figure 10:
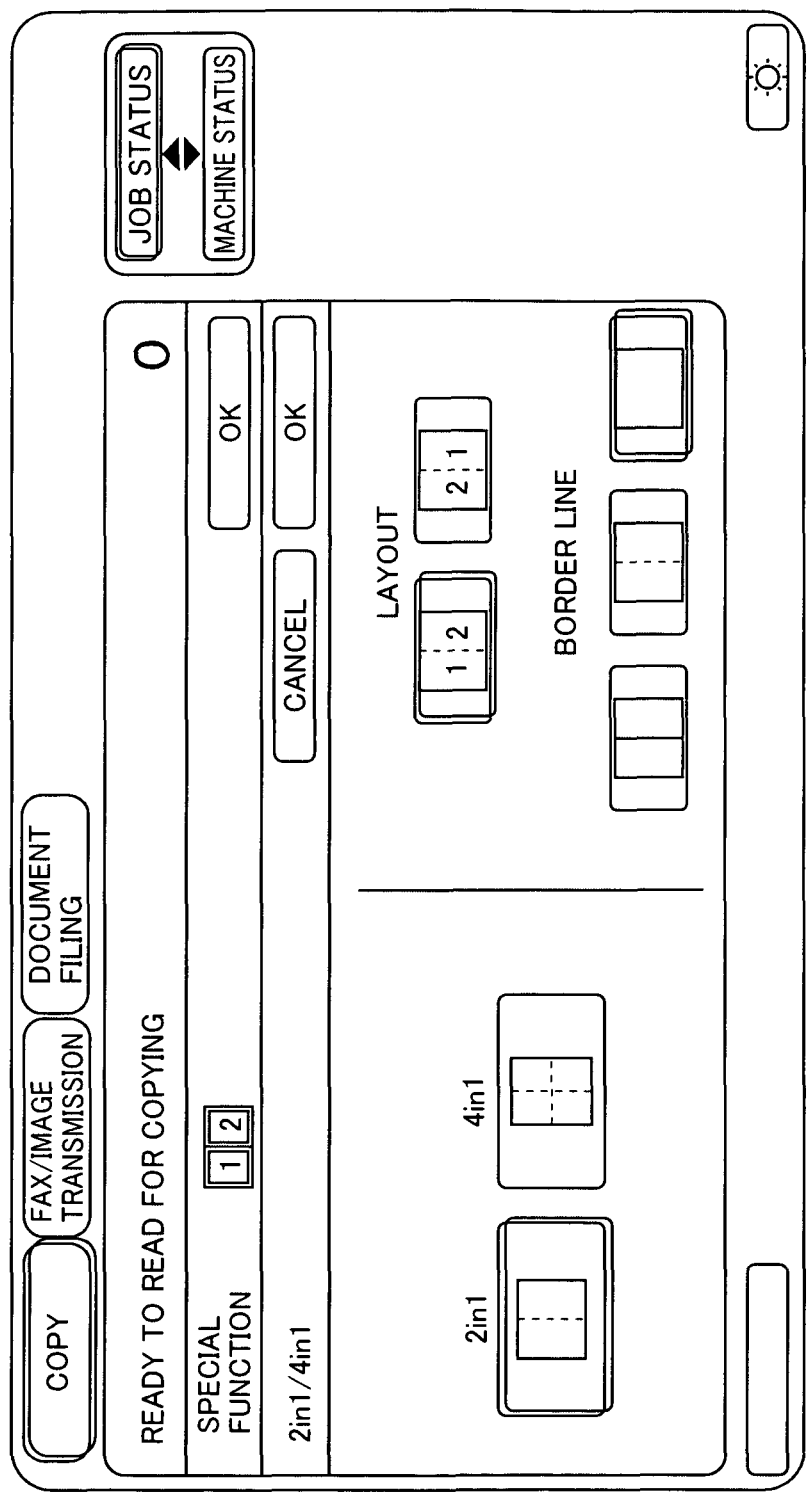

In FIG. 9, when the user presses the "2-in-¼-in-1" button (YES at S3036), the setting image for the selected second function is displayed on touch-panel display 380 (S3038). FIG. 10 is an exemplary image of "2-in-¼-in-1" setting menu displayed on touch-panel display 380 after the "2-in-¼-in-1" button is pressed in FIG. 9.

Figure 11:
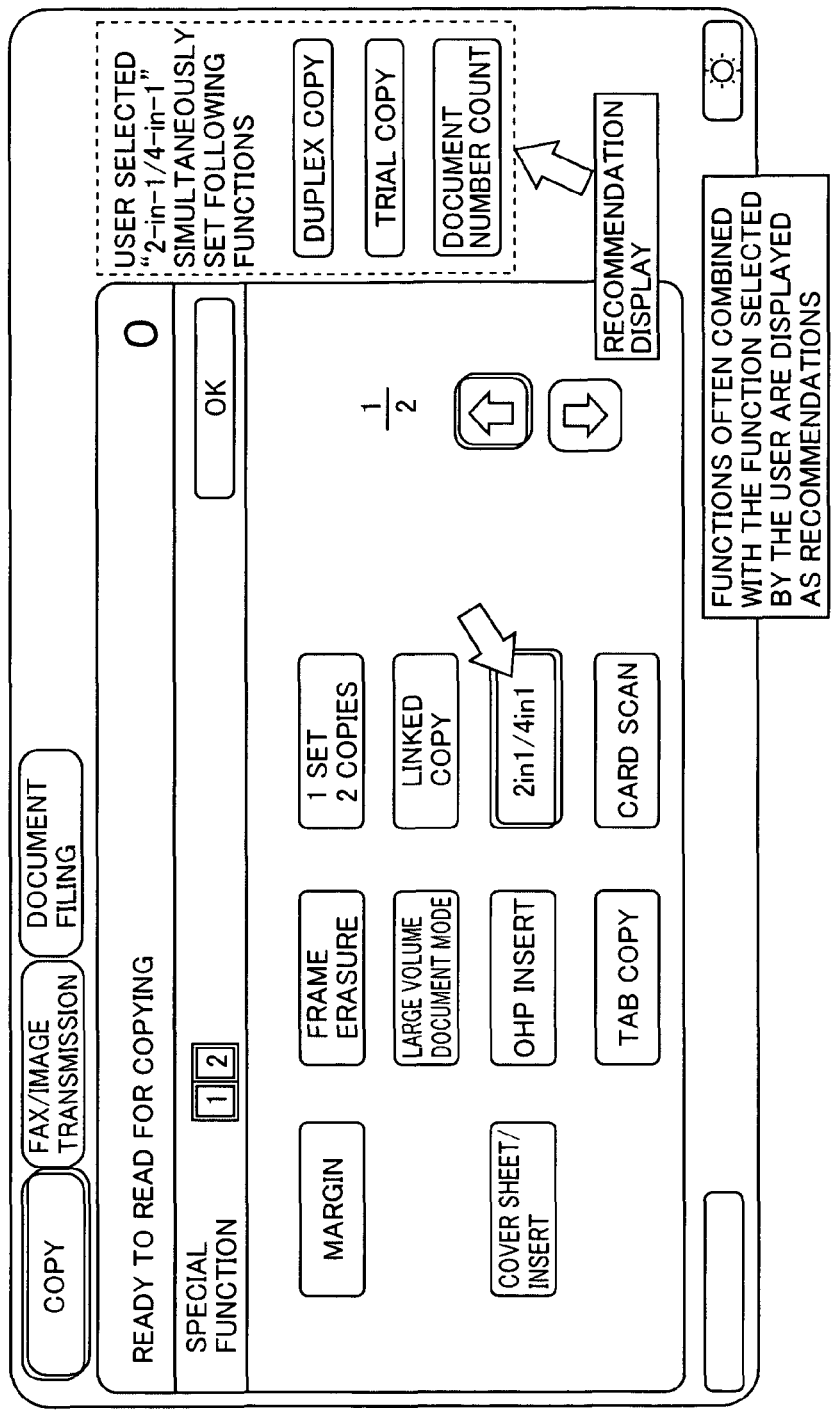

In FIG. 10, when the user presses a setting button for a detailed item (2-page collection or 4-page collection, layout, border line) related to the "2-in-¼-in-1" and presses "OK" button for "2-in-¼-in-1", the second function is established (YES at S3040). When "2-in-¼-in-1" as the second function is established, the function combination management table is read (S3042), and three functions of higher priority that are highly frequently combined with the established "2-in-¼-in-1" function are displayed as recommended functions, as shown in FIG. 11. In FIG. 11, three functions often combined recently (in the past six months) with the function selected by the user are displayed, though the display is not limited to such three functions. Here, as shown in FIG. 11, the display returns to the special function menu, an image allowing selection of one function from a plurality of functions included in the special function is displayed on touch-panel display 380, and "duplex copy", "trial copy" and "count document number" that are often combined with the "2-in-¼-in-1" function established to be selected are displayed (S3044).

As described above, in the network image forming system in accordance with the present embodiment, when the user selects one function from various functions of the multi-function peripheral, a function or functions used in combination with the selected function by a user in the past (here, the user is the user himself/herself or other users) are displayed as recommended functions. Different from the conventional art, a function that is often used by others in combination with the function the user himself/herself selected is displayed. As a result, it becomes possible to efficiently know an effective combination of functions of the multi-function peripheral that is not known to the user but used by other users. When the function of server computer is implemented by one of the plurality of multi-function peripherals, such an effect can be realized without necessitating a server computer. Further, such a function can be realized simply by a multi-function peripheral having the function of a server computer, without necessitating a plurality of multi-function peripherals.

-Second Embodiment-

In the following, the second embodiment of the present invention will be described.

MFP 300 forming the network image forming system in accordance with the present embodiment executes a function setting program partially different from that executed by MFP 300 in accordance with the first embodiment described above.

Figure 12:
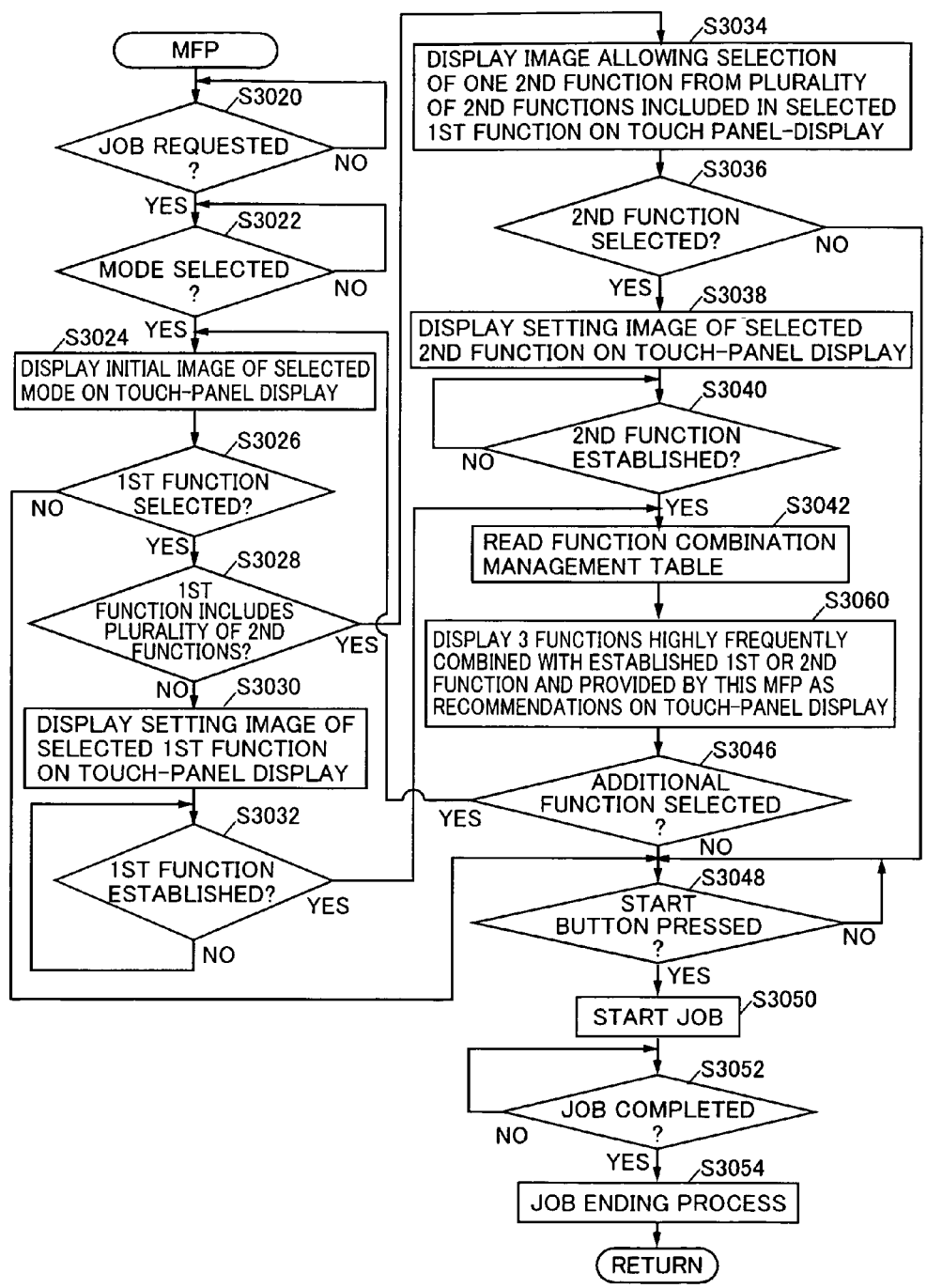
FIG. 12 is a flowchart representing a control structure of a function setting program executed by the MFP in accordance with the second embodiment of the present invention.

FIG. 12 is a flowchart representing a control structure of the function setting program executed by MFP 300 in accordance with the present embodiment. The flowchart corresponds to the flowchart of FIG. 7 described above. The flowchart shown in FIG. 7 differs from the flowchart shown in FIG. 12 only in that the process of step S3044 in FIG. 7 is changed to process of step S3060 in FIG. 12.

Referring to FIG. 12, at S3060, CPU 310 displays as recommendations, three functions of higher priority that are combined with high frequency with the established first function or the established second function and available in this MFP 300 on touch-panel display 380. The number of recommended functions displayed at this time is not limited to three, and larger number of recommended functions may be displayed. It is also possible that a management table including the field of combination number of past six months is used as the function combination management table stored in HDD 340 of MFP 300, and (any number of) functions of which number of combinations in the past six months exceeds a threshold value (for example, 20 times) may be displayed.

According to such an approach, if the second function of "2-in-¼-in-1" is established by way of example (YES at S3040), the function combination management table is read (S3042), and three functions of higher priority that are combined with high frequency (the number of combinations is large in the past six months) with the established "2-in-¼-in-1" function and that can be provided by MFP 300, are displayed as recommended functions (S3060). An MFP 300 includes a basic unit, and it is often the case that a duplex copying unit, an automatic document feeder unit and the like are sold as options. Therefore, not all MFPs 300 have the same functions. Specifically, if a recommended function often used in an MFP 300 is displayed, it is senseless for a user of another MFP not having such a function. Therefore, in the multi-function peripheral in accordance with the present embodiment, only the recommendable functions that can be actually selected in combination are displayed as recommended functions, on the touch-panel display.

In such a case, it is preferred to notify the user that a function not selectable in MFP 300 is combined with high frequency, or to notify by which MFP 300 the function is available.

-Third Embodiment-

In the following, the third embodiment will be described.

Server computer 200 forming the network image forming system in accordance with the present embodiment stores, in HDD 240, a function-by-function weight (eco-evaluation degree) management table, not stored by the server computer 200 of the first embodiment, and executes a use history processing program partially different from that of server computer 200 in accordance with the first embodiment described above.

Referring to FIG. 13, the function-by-function weight (eco-evaluation degree) management table stored in HDD 240 of server computer 200 in accordance with the present embodiment will be described. The function-by-function weight management table stores, function by function, the weight (eco-evaluation degree) indicating how much waste of sheet of recording paper, waste of toner and waste of power consumption can be reduced by each function. The weight of function-by-function weight management table (eco-evaluation degree) should preferably be set in an objective and uniform manner and, therefore, the weight is set or changed, for example, by an administrator.

As shown in FIG. 13, the function-by-function weight management table consists of a field for storing function and a field for storing weight (eco-evaluation degree) for the function. By way of example, the value of weight (eco-evaluation degree) is set such that the value of "4-in-1" that can reduce the waste of recording paper more than "2-in-1" is made higher. Further, among the functions shown as examples in FIG. 13, "trial copy," in which an expected output realized by image formation with the set function is simply displayed (as a preview) on touch-panel display 380 and no sheet of recording paper is actually consumed, is set to have the highest weight (eco-evaluation degree).

FIG. 14 is a flowchart representing a control structure of a use history processing program executed by server computer 200 and MFP 300 in accordance with the present embodiment. The flowchart corresponds to the flowchart of FIG. 6 described above. The flowchart shown in FIG. 6 differs from the flowchart of FIG. 14 only in that the process of S2006 of FIG. 6 is changed to processes of S2030 and S2032 in FIG. 14.

Referring to FIG. 14, at S2030, CPU 210 reads the function-by-function weight (eco-evaluation degree) management table shown in FIG. 13. At S2032, based on the use history information stored in the use history management table and the function-by-function weight (eco-evaluation degree) stored in the function-by-function weight (eco-evaluation degree) management table, CPU 210 collects the functions combined with the set function. Here, collection is done, for example, with the weight multiplied.

Let us consider the first embodiment described above in connection with such an approach. By way of example, according to the collection of the function combination management table shown in FIG. 5, in the past six months, "duplex copy" is combined 50 times, and "trial copy" is combined 45 times, respectively, with "2-in-¼-in 1". Namely, the display priority of "duplex copy" is higher than "trial copy", for the combination with "2-in-¼-in-1."

According to the present embodiment, "duplex copy" is collected with the weight value of 1.05 multiplied and, therefore, the collected count of "duplex copy" becomes 52.5 times. As for "trial copy," the weight value of 1.55 is multiplied and, therefore, the collected count of "trial copy" becomes 69.75 times. Therefore, the display priority of "trial copy" becomes higher than "duplex copy" for the combination with "2-in-¼-in-1".

In this manner, a recommended function that is frequently combined and attains higher effect of energy saving comes to have higher display priority. Therefore, according to the multi-function peripheral in accordance with the present embodiment, a recommended function that has higher effect of energy saving is given priority and displayed high on the list. When the user selects the recommended function displayed high on the list, energy consumption can be reduced (energy saving can be promoted).

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus comprising:
    (1) an information processing apparatus that processes information related to a combination of functions selected by a user from a plurality of functions of an image forming apparatus, wherein
        said information processing apparatus includes:
            an obtaining unit obtaining use history information related to the function selected by the user,
            a use history storage unit storing said use history information,
            a collecting unit collecting combination information related to frequency of combination between one function and another function, based on the stored use history information, and
            an applying unit applying the collected combination information to said image forming apparatus;
    (2) a combination storage unit storing said combination information;
    (3) a selecting unit allowing the user to select one function from a plurality of functions; and
    (4) a display unit displaying, on a function setting screen image, a function combined with high frequency with said selected one function based on said combination information, not to overlap with any function setting button included in said function setting screen image.

2. The image forming apparatus according to claim 1, further comprising
    a function storage unit storing, function by function, degree of benefit received by the user when a function is selected; wherein
    said collecting unit collects said combination information using said degree of benefit.

3. The image forming apparatus according to claim 2, wherein
    said benefit is benefit of energy saving.

4. The image forming apparatus according to claim 2, wherein
    said collecting unit collects said combination information such that the higher becomes the degree of benefit, the higher becomes the frequency.

5. The image forming apparatus according to claim 4, wherein said benefit is benefit of energy saving.

6. The image forming apparatus according to claim 1, wherein
    said display unit displays said function or functions that are combined with high frequency, excluding a function not available in the apparatus.

7. The image forming apparatus according to claim 1, wherein said display unit displays functions that are combined with high frequency in order, starting from a function of the highest frequency.

8. The image forming apparatus according to claim 7, wherein
    said display unit displays said function or functions that are combined with high frequency, excluding a function not available in the apparatus.

\* \* \* \* \*